Patented Aug. 8, 1933

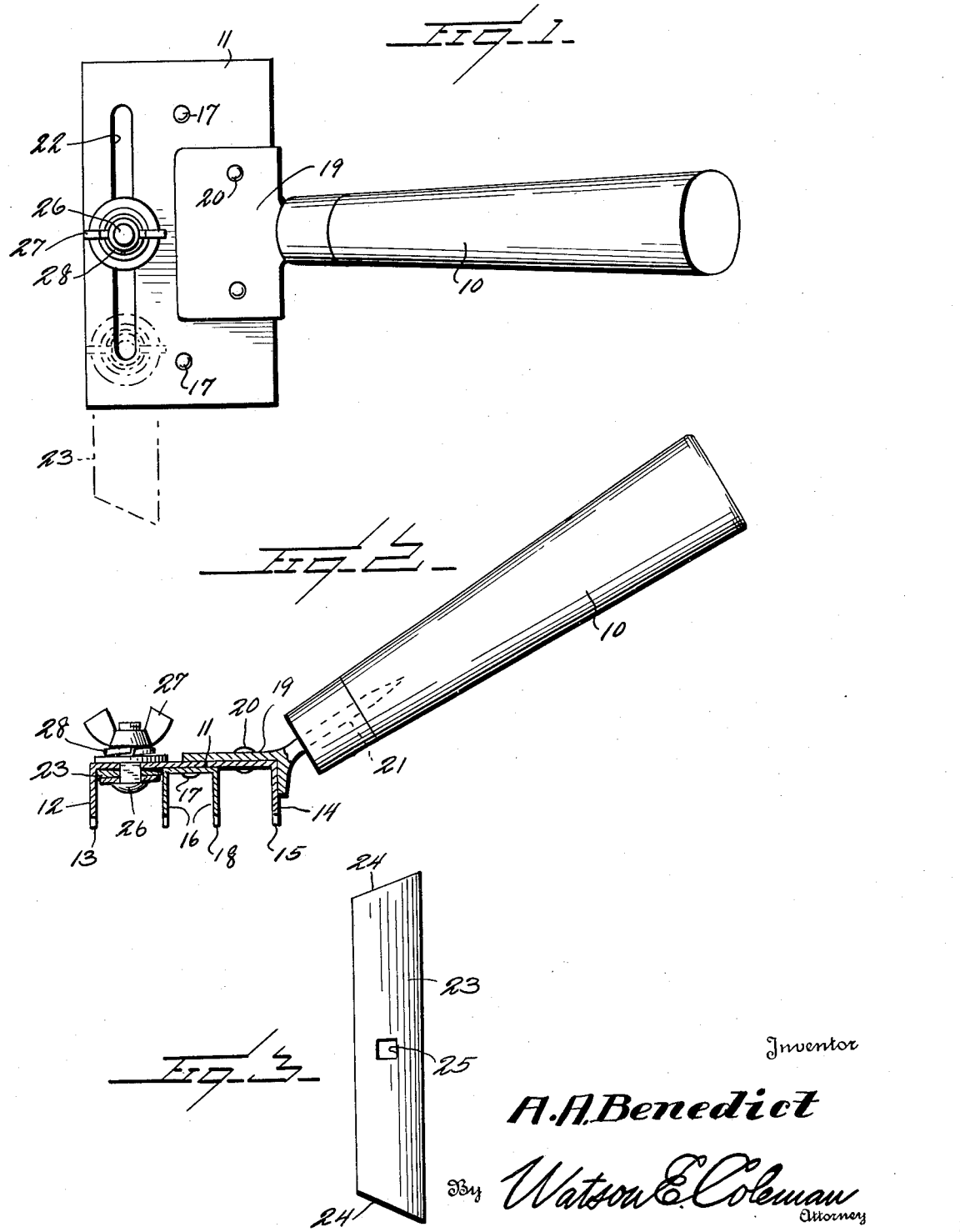

1,920,954

UNITED STATES PATENT OFFICE 1,920,954

COMBINATION FISH SCALER AND KNIFE

Austin A. Benedict, Merrill, Wis.

Application May 12, 1932. Serial No. 610,948

1 Claim. (Cl. 17—7)

This invention relates to fish scaling means and more particularly to a combined fish scaler and cleaning tool.

An object of this invention is to provide a combination tool for the cleaning of fish so that the fish can be readily cleaned with the use of only one tool.

Another object of this invention is to provide an exceedingly simple combination tool construction which can be readily and cheaply manufactured.

A further object of this invention is to provide a retractible cutting member which is carried by the scaling means so that the member can be moved into inoperative position during the scaling operation.

The above and various other objects and advantages of this invention will in part be described in and in part be understood from the following detailed description of the present preferred embodiment, the same being illustrated in the accompanying drawing wherein:—

Figure 1 is a detail top plan view of a device constructed according to the preferred embodiment of this invention.

Figure 2 is a detail side elevation partly in section of the device.

Figure 3 is a top plan view of the blade removed from the scraper.

Referring to the drawing wherein like numerals of reference designate corresponding parts throughout the several views, the numeral 10 designates generally a handle which has mounted thereon a fish scaling means, this scaling means comprising a body plate 11 which is provided with an angularly related arm or extension 12 provided with scaling teeth 13 at the forward edge thereof. The plate 11 is also bent at substantially right angles along the rear edge thereof, as at 14, and this extension is also provided with scaling teeth 15. An inner U-shaped scaling means 16 is secured to the inner surface of the body plate 11 by means of rivets or securing elements 17 and this U-shaped scaling means is also provided with scaling teeth 18 or the like.

A substantially L-shaped plate 19 is secured as by rivets or securing elements 20 to the body plate 11 and is provided with a stud or stem 21 extending into the forward end of the handle 10. The body plate 11 is provided adjacent the forward edge thereof with an elongated slot 22, and a keen-edge blade 23 provided with tapering end portions 24 is mounted between the flange or arm 12 and the forward leg of the U-shaped scaling member 16.

A bolt 26 extends through an opening 25 provided in the blade 23 and this bolt 26 is extended through the elongated slot 22 and provided with a thumb nut 27 so that the blade 23 can be adjusted relative to the body plate 11. A split resilient lock washer 28 is interposed between the thumb nut 27 and the plate 11 so that the blade 23 will be held in adjusted position relative to the plate 11 without undue tightening of the thumb nut 27.

Preferably, the hole or opening 25 is of angular construction so that the bolt 26 will not turn relative to the blade 23. The handle 10 is mounted at substantially an obtuse angle to the longitudinal axis of the plate 11 so as to facilitate movement of the scaling means over the body of the fish.

In the use of this device, the blade 23 may be left or disposed intermediate the ends of the plate 11 during the scaling operation and, when it is desired to cut the fish open, the blade 23 may be moved outwardly of one end of the plate or body 11 with the keen edged portion of the blade confronting the handle 10. By cutting or beveling the opposite ends of the blade 23, as shown at 24, it will be a relatively easy matter to force the point of this blade into the fish so as to split the fish for cleaning.

It is, of course, understood that various changes and modifications may be made in the details of construction and design of the above specifically described embodiment of this invention without departing from the spirit thereof, such changes and modifications being restricted only by the scope of the following claim.

What is claimed is:—

A combination tool comprising a handle, a scaling member mounted on the handle, said scaling member comprising a body plate and a plurality of angularly related toothed blades carried by said body, said body having an elongated slot extending transversely of the length of the handle and disposed between certain of said toothed blades, a smooth-edged blade disposed between certain of said toothed blades and held against turning movement thereby, and means engaging said smooth-edged blade and engaging in said slot to adjust the latter blade relative to the body.

AUSTIN A. BENEDICT.